(12) United States Patent
Barbarin et al.

(10) Patent No.: US 9,915,440 B2
(45) Date of Patent: Mar. 13, 2018

(54) DEVICE FOR REGULATING THE AIR FLOW IN A PIPE

(71) Applicant: ANJOS VENTILATION, Torcieu (FR)

(72) Inventors: Laurent Barbarin, Amberieu en Bugey (FR); Christian Barbarin, Amberieu en Bugey (FR)

(73) Assignee: ANJOS VENTILATION, Torcieu (FR)

( * ) Notice: Subject to any disclaimer, the term of this patent is extended or adjusted under 35 U.S.C. 154(b) by 586 days.

(21) Appl. No.: 14/337,467

(22) Filed: Jul. 22, 2014

(65) Prior Publication Data
US 2015/0031280 A1    Jan. 29, 2015

(30) Foreign Application Priority Data

Jul. 23, 2013 (FR) ..................... 13 57224

(51) Int. Cl.
| F24F 7/00 | (2006.01) |
| F24F 13/08 | (2006.01) |
| F24F 13/14 | (2006.01) |
| F24F 11/047 | (2006.01) |
| F24F 13/10 | (2006.01) |
| F16K 15/03 | (2006.01) |
| G05D 7/01 | (2006.01) |

(52) U.S. Cl.
CPC ............ *F24F 13/14* (2013.01); *F16K 15/033* (2013.01); *F24F 11/047* (2013.01); *F24F 13/10* (2013.01); *G05D 7/0173* (2013.01)

(58) Field of Classification Search
CPC .......... F16K 15/033; F16K 31/06; F16K 1/22; F24F 11/047; F24F 13/10; F24F 13/14; F24F 11/04; F24F 13/15; G05D 7/0173
USPC ................................................. 454/256, 333
See application file for complete search history.

(56) References Cited

U.S. PATENT DOCUMENTS

| 3,561,345 A * | 2/1971 | Kline .................... F24F 1/0007 |
| | | 251/83 |
| 5,406,977 A | 4/1995 | Barbarin et al. |
| 5,741,180 A * | 4/1998 | Xia ........................ F16K 1/223 |
| | | 454/327 |

FOREIGN PATENT DOCUMENTS

| DE | 44 11 260 | 4/1995 |
| DE | 20 2004 003811 | 11/2004 |

(Continued)

OTHER PUBLICATIONS

French Search Report dated Apr. 11, 2014, in corresponding French Priority application.

*Primary Examiner* — Helena Kosanovic
*Assistant Examiner* — Wes Anderson, Jr.
(74) *Attorney, Agent, or Firm* — Young & Thompson (57) ABSTRACT

This device (D) for regulating the air flow in a pipe includes a flap (6) delimiting, relative to an inner surface (104) of a pipe (10) of the device (D), an air passage section (S), and an adjusting calibrating element (8) movable between a first position and a second position. The device includes a sealing wall (12), extending between the calibrating element and an inner surface (106) of the duct (10), suitable for preventing the passage of air from the side of the duct (10) opposite the air passage section (S). The sealing wall (12) is rotatable relative to the pipe (10) under the action of the movement of the calibrating element, and the calibrating element includes a front wall (86) perpendicular to the longitudinal axis (X-X') of the duct (10) which, in the first position of the calibrating element, does not protrude past the circumference of the duct.

10 Claims, 7 Drawing Sheets

(56) References Cited

FOREIGN PATENT DOCUMENTS

| FR | 2 707 740 | 1/1995 | | |
|----|-----------|--------|---|---|
| FR | 2 728 660 | 6/1996 | | |
| FR | 2728660 A1 * | 6/1996 | .......... | F24C 15/2021 |
| FR | 2 736 709 | 1/1997 | | |
| FR | 2762665 A1 * | 10/1998 | .............. | F24F 13/24 |
| GB | 1 206 290 | 9/1970 | | |

* cited by examiner

DEVICE FOR REGULATING THE AIR FLOW IN A PIPE

FIELD OF THE INVENTION

The present invention relates to a device for regulating the air flow in a pipe.

BACKGROUND OF THE INVENTION

In the field of devices for regulating the air flow in a pipe, it is known, in particular from FR-B-2,728,660, to use a calibrating element to adjust the value at which the air flow passing the device is kept substantially constant. A moving flap making it possible to adjust the flow dynamically is mounted with the possibility of pivoting on the calibrating element. The movement of the flap causes the area of an air passage section, delimited by the flap relative to an inner surface of the duct, to vary. The calibrating element is placed in a more or less advanced position in an air duct of the device in order to adjust the air flow, by translating the calibrating element transversely to the longitudinal axis of the duct. In order to ensure sealing of the part of the duct opposite the air passage section, the calibrating element comprises a front face that conceals the duct. When the calibrating element is in its position allowing a maximum flow, that front face tends to protrude from the circumference of the device, such that its implantation in a pipe is delicate.

SUMMARY OF THE INVENTION

The invention aims to resolve these drawbacks by proposing a new device for regulating the air flow in a pipe, the structure of which makes it possible to prevent parts of the calibrating element from protruding from the circumference of the duct.

To that end, the invention relates to a device for regulating the air flow in a pipe, comprising a duct suitable for being embedded in the pipe, a flap moving as a function of the air flow entering the duct, the flap delimiting, relative to an inner surface of the duct, an air passage section, and an adjustable calibrating element mounted translatable along a transverse axis perpendicular to an axis of rotation of the flap, between a first position, in which the air flow that can pass in the device is maximal, and a second position, in which the air flow that can pass in the device is minimal. This device is characterized in that it comprises a sealing wall, extending between the calibrating element and an inner surface of the duct, suitable for preventing the passage of air on the side of the duct opposite the air passage section, that sealing wall being rotatable relative to the pipe under the action of the movement of the calibrating element, and in that the calibrating element comprises a front wall perpendicular to the longitudinal axis of the duct which, in the first position of the calibrating element, does not protrude past the circumference of a front face of the duct.

Owing to the invention, the sealing of the part of the duct opposite relative to the air passage section is made by a wall that does not protrude from the circumference of the device and makes it possible to install the regulating device in a pipe far from the opening of a wall.

According to advantageous, but optional aspects of the invention, such a device may incorporate one or more of the following features, considered in any technically allowable combination:

- the sealing wall is rotatable relative to the duct around an axis of rotation parallel to the axis of rotation of the flap.
- the sealing wall is connected to the calibrating element by at least one slug formed on the calibrating element and inserted into a cavity of the sealing wall.
- in the first position of the calibrating element, the sealing wall rests against a planar wall of the regulating device in a position parallel to the longitudinal axis of the duct and the planar wall comprises at least one recess for receiving the slug of the calibrating element and part of the sealing wall defining the cavity.
- the calibrating element comprises two parallel slugs inserted in two parallel cavities of the sealing wall.
- the flap comprises, on one end of a planar surface of the flap, two surfaces that truncate the end of the planar face of the flap and the shape of which corresponds to the shape of an inner surface of the duct.
- the surfaces that truncate the end of the flap are in the form of a cylinder segment with a circular section.
- the curve radius of the cylinder segment surfaces is equal to the curve radius of a cylinder segment inner surface of the duct.
- the flap comprises two planar side walls parallel to each other and perpendicular to the axis of rotation of the flap, and a rear surface extending from the end of the planar surface opposite a front edge of the flap relative to the axis of rotation of the flap, while the cylinder segment surfaces are arranged at the intersections between the planar surface, the rear surface and the side walls.
- in the second position of the calibrating element, the travel of the flap extends to a limit position in which the area of the air passage section is minimal, and in which the cylinder segment surface of the flap can come into surface contact with the cylinder segment inner surface of the duct.

BRIEF DESCRIPTION OF THE DRAWINGS

Other advantages of the invention will appear more clearly in light of the following description of a device for regulating the air flow according to its principle, done as a non-limiting example in reference to the appended drawings, in which.

DETAILED DESCRIPTION OF THE INVENTION

FIGS. 1 to 7 show a device D for regulating the air flow in a pipe, not shown. The device D may in particular be installed in an air duct in a flow regulator configuration, or be installed at the outlet of an air duct against a wall in a ventilation mouth configuration.

The device D comprises a cylindrical sleeve with a circular section 2 suitable for being embedded in the pipe.

On an outer surface, the sleeve 2 comprises a seal 4 suitable for ensuring sealing between the sleeve 2 and the walls of the pipe. The device D also comprises an inner duct 10 mounted in the sleeve 2. The sleeve 2 and the inner duct 10 together define a longitudinal axis X-X'.

Figure 4:
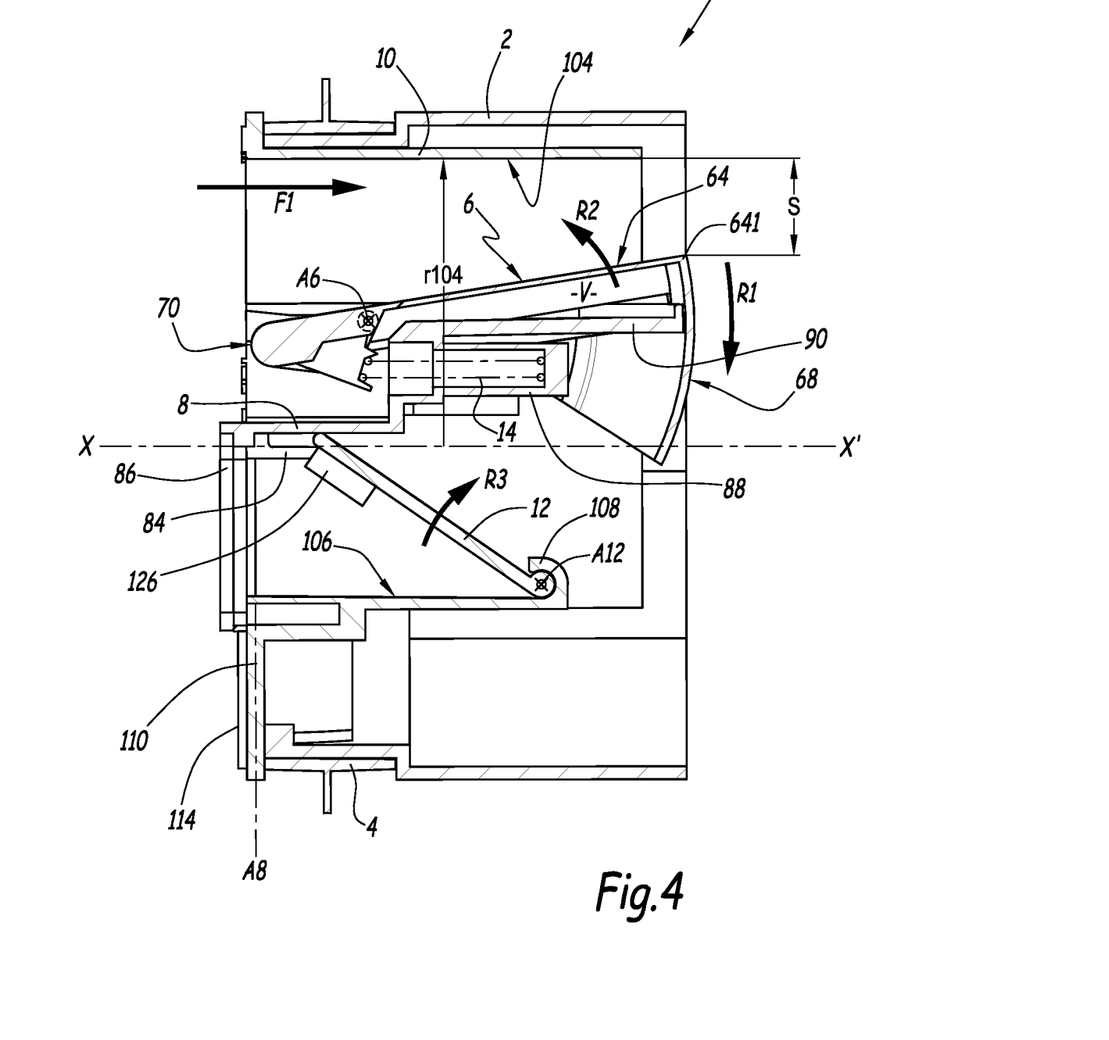
FIG. 4 is a cross-sectional view along plane IV of the device in the configuration of FIG. 2.

The device D also comprises a flap 6 movable as a function of the air flow entering the inner duct 10 along the arrow F1 in FIG. 4. The position of the flap 6 is controlled dynamically by the air flow circulating in the inner duct 10. The more significant the incoming air flow is, the more the flap 6 seals the inner duct 10 in order to reduce the air flow passing in the device D so that it is substantially constant.

The flap 6 is mounted, with the possibility of pivoting around an axis of rotation A6 perpendicular to axis X-X', in an adjustable calibrating element 8, which in turn is mounted in the inner duct 10. The calibrating element 8 makes it possible to adjust the value at which the air flow passing in the device D is kept substantially constant. The calibrating element 8 is mounted translatable, relative to the inner duct 10, along an axis A8 perpendicular to the axis of rotation A6 and the longitudinal axis X-X'. The calibrating element 8 is mounted in the inner duct 10 with the possibility of translation along the axis A8. The inner duct 10 comprises two planar side walls 102 between which the calibrating element 8 is capable of moving. The calibrating element 8 is movable between a first lower position, shown in FIGS. 1 and 3, in which the air flow passing in the inner duct 10 can be maximal, and a second upper position, shown in FIGS. 2 and 4, in which the air flow passing in the inner duct 10 is minimal. Between these two positions, the calibrating element 8 can be placed in intermediate positions.

Figure 5:
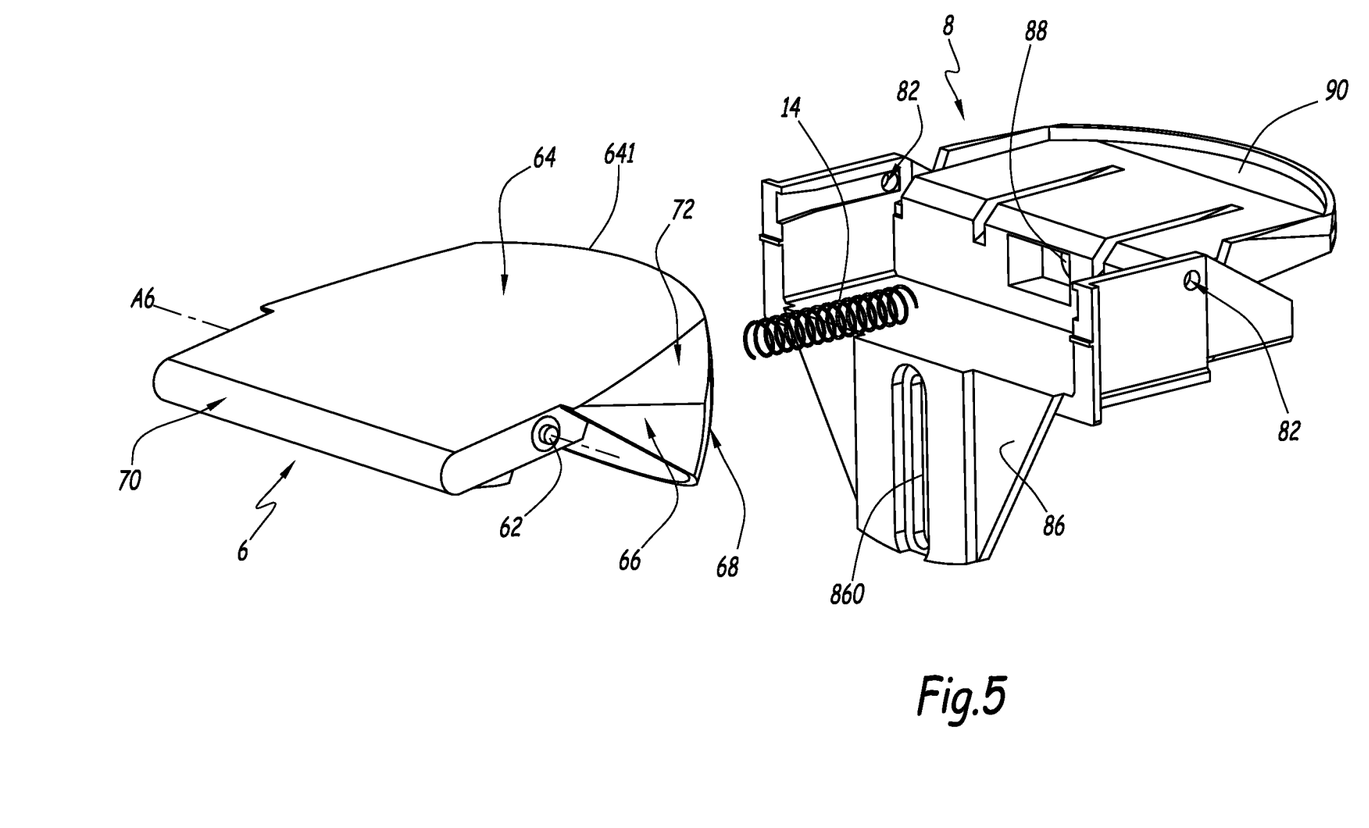
FIG. 5 is an exploded perspective view, from another angle, of part of the device of FIGS. 1 to 4.
Figure 6:
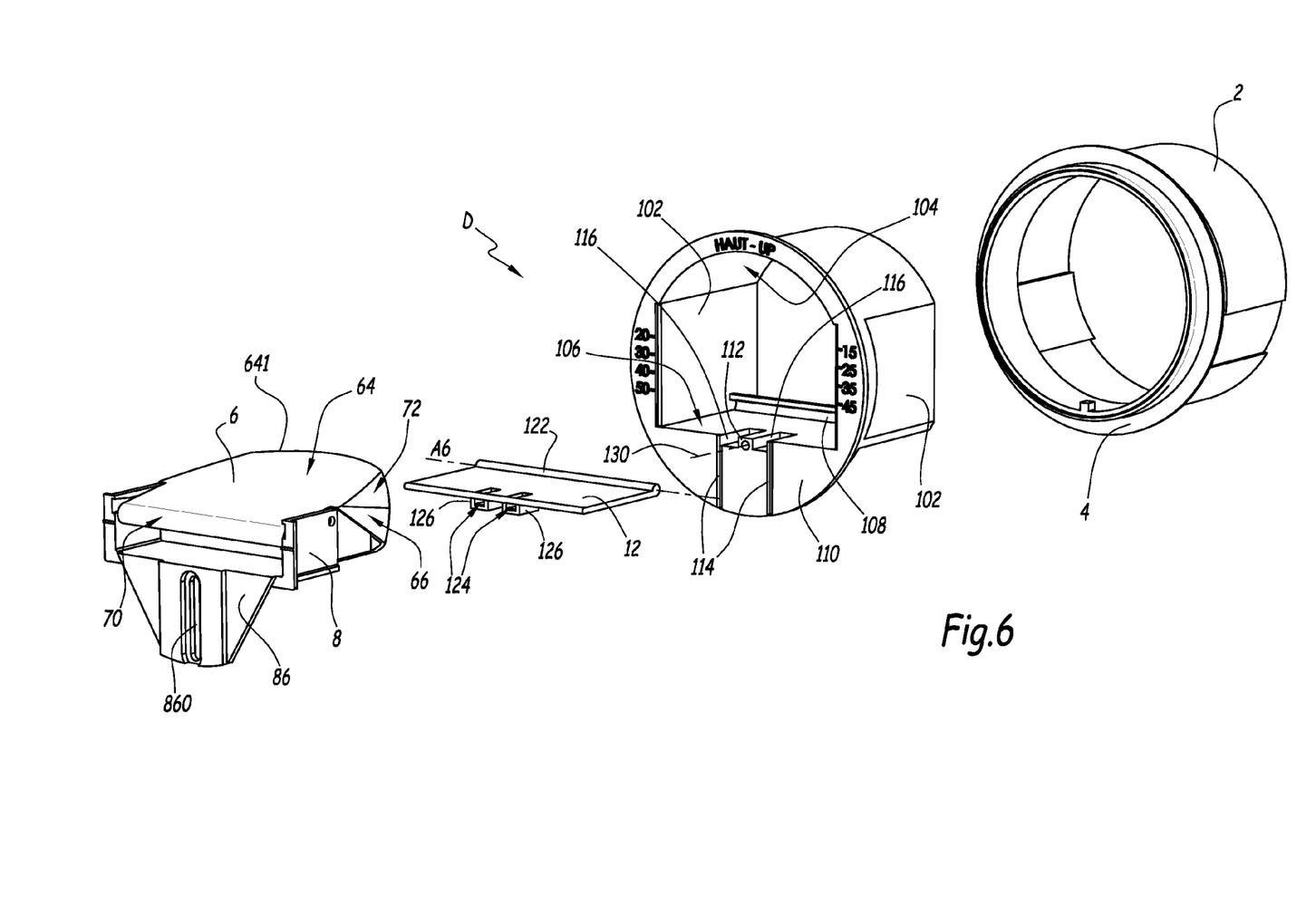
FIG. 6 is an exploded perspective view of the assembly of the device of FIGS. 1 to 4.
Figure 7:
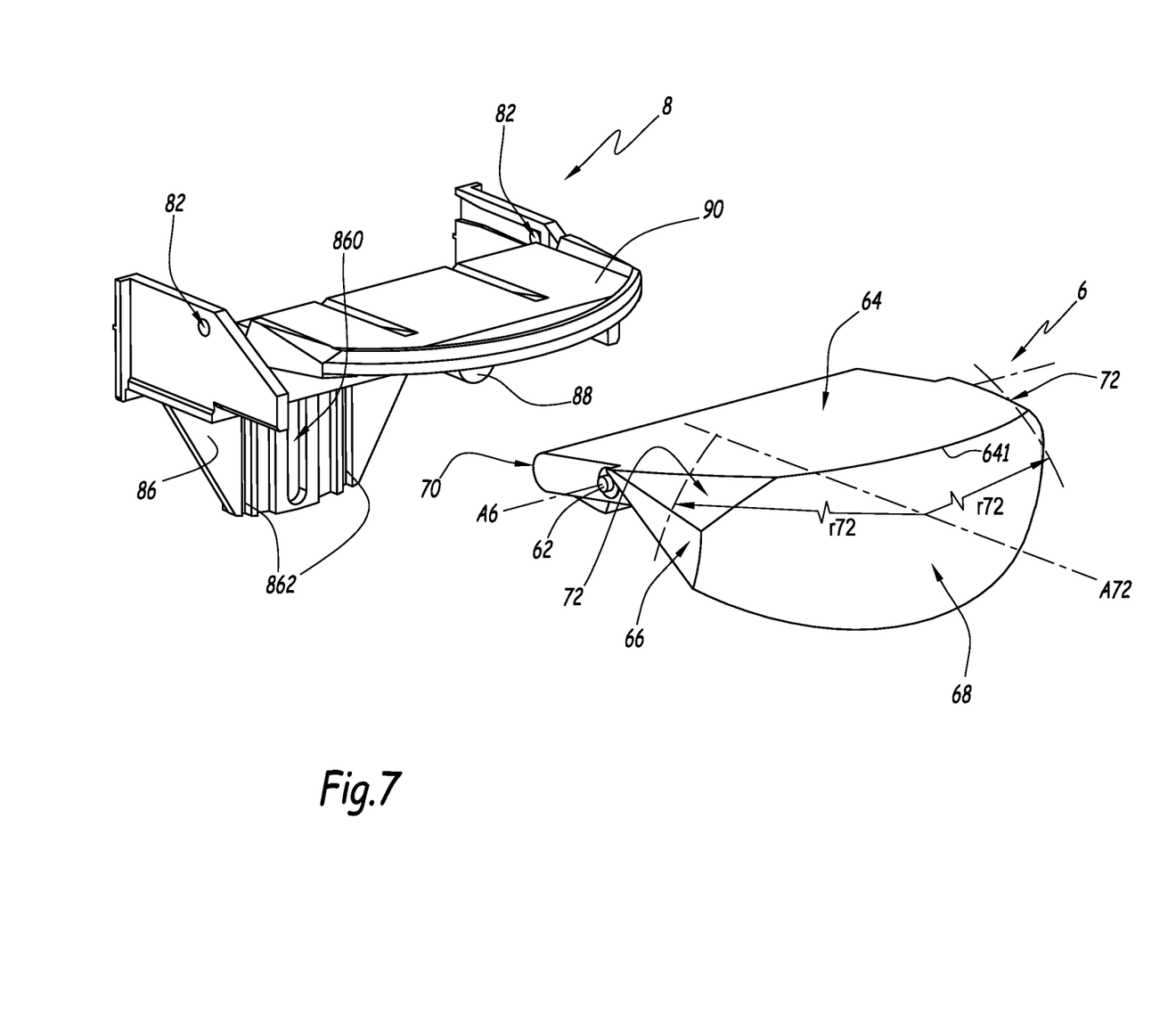
FIG. 7 is an exploded perspective view, from another angle, of the part of the device visible in FIG. 5.

The flap 6 comprises two slugs, only one of which is visible in FIGS. 5 and 7 with reference 62, which extend on either side of the flap 6 along the axis A6. The slugs 62 are inserted into holes 82 of the calibrating element 8 so as to ensure the rotation of the flap 6 relative to the calibrating element 8, around the axis A6.

Figure 1:
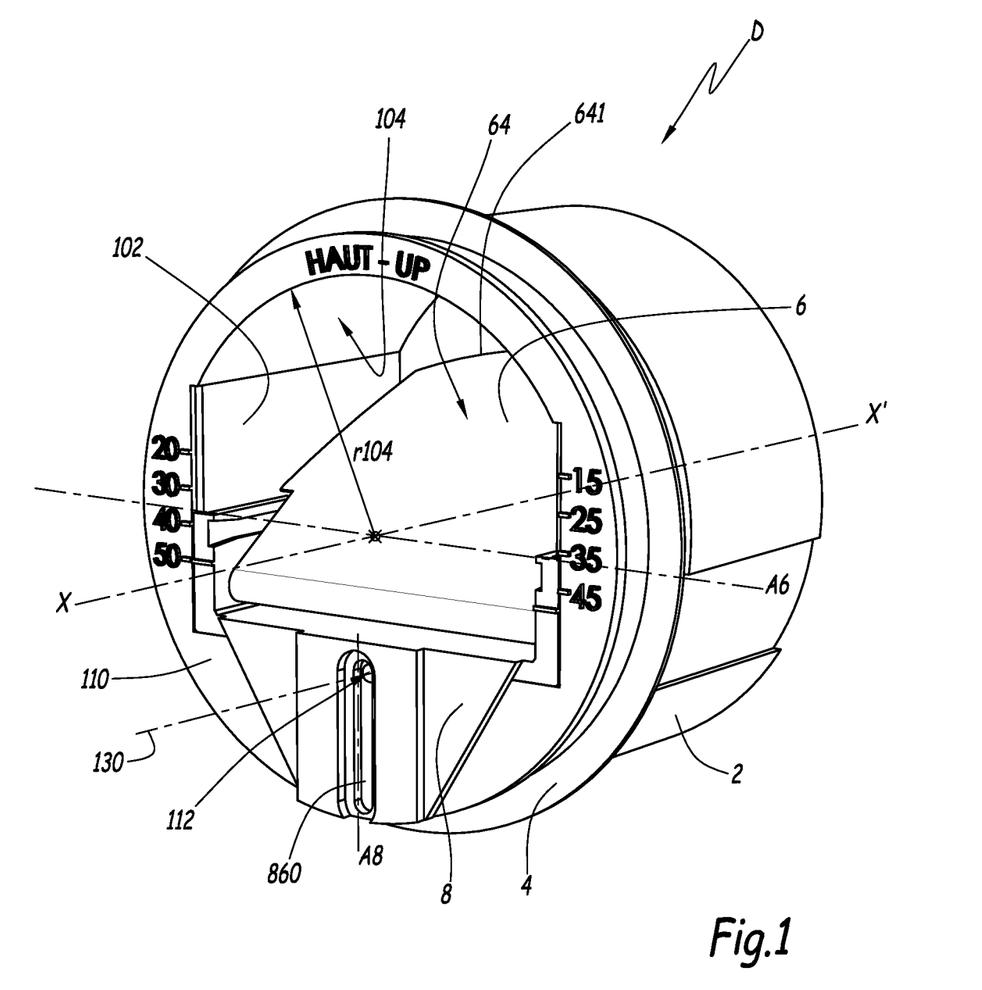
FIGS. 1, 2 and 3 are perspective views of a device for regulating the air flow according to the invention in first, second and third configurations.
Figure 2:
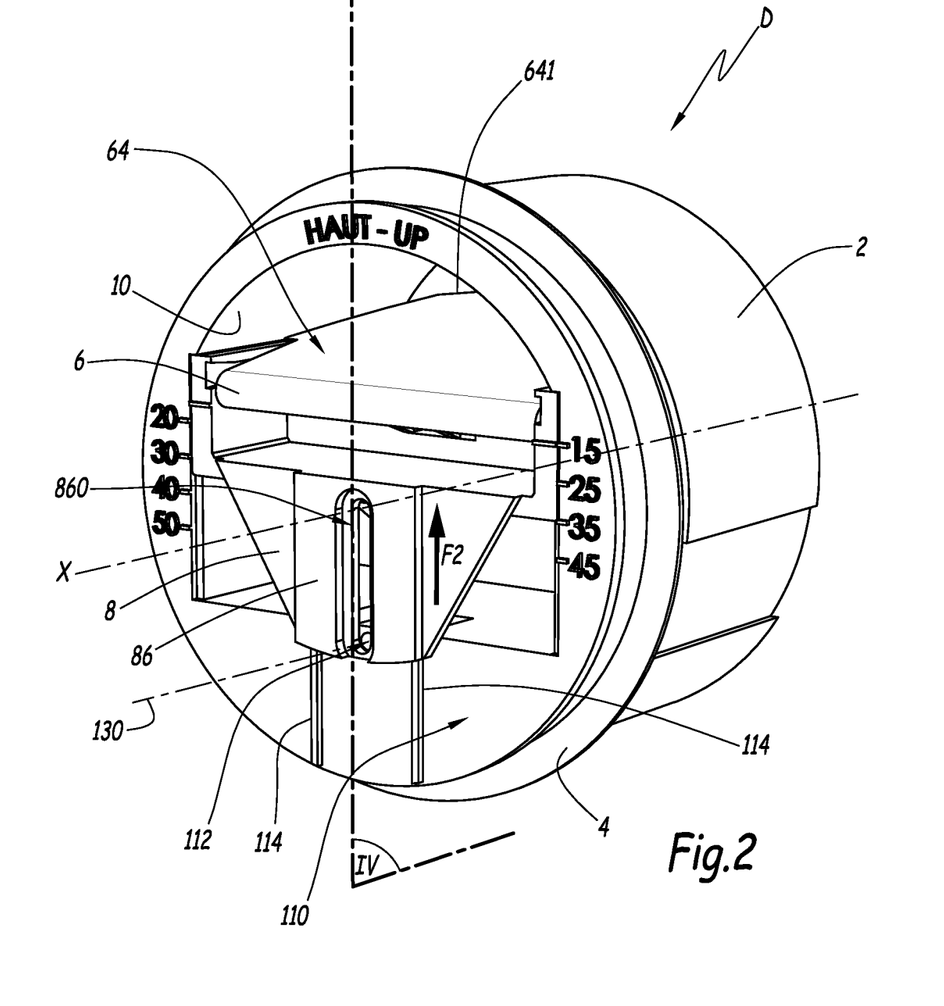

The flap 6 comprises a planar face 64 ending with an end 641 that defines, relative to a cylinder segment upper inner surface 104, of the inner duct 10, situated between the walls 102, an air passage section S in the regulating device D. The flap 6 is movable between a first position shown in FIGS. 2 and 3, in which the air passage section S has a maximal area, and a second position shown in FIG. 1, in which the air passage section S has a minimal area. The difference between these two positions corresponds to the angular travel of the flap 6. When the calibrating element 8 is in the position of FIGS. 1 and 3, the travel of the flap 6 is maximal, since no element of the inner duct 10 prevents the movement of the flap 6 toward its second position. In the configuration of FIG. 2, when the calibrating element 8 is in its second position, the end 641 comes into contact with the upper surface 104 of the inner duct 10, which prevents the flap 6 from moving to its second position and reduces the travel of the flap 6.

Figure 3:
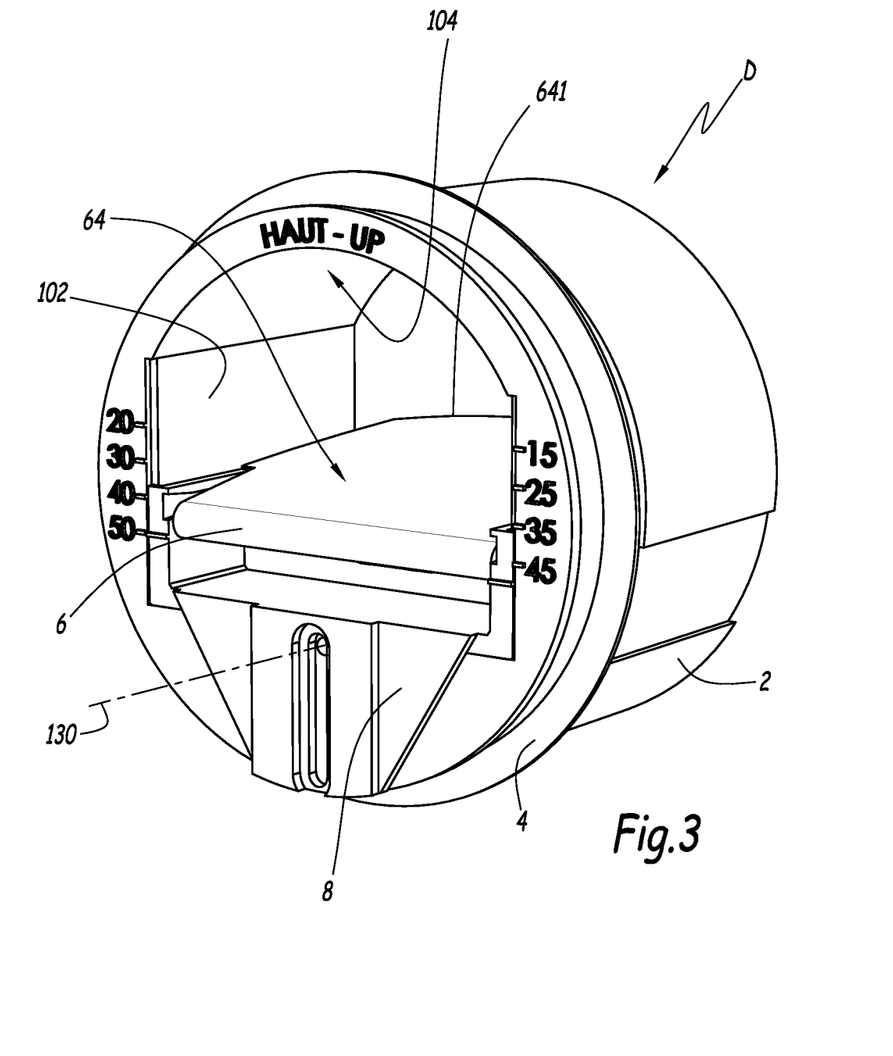

The flap 6 is recalled by the elastic return spring 14 toward its position of FIGS. 2 and 3. The spring 14, shown only in FIGS. 4 and 5, is a spiral compression spring mounted in a cylindrical housing 88 formed in the calibrating element 8. The spring 14 exerts a force on the flap 6 that tends to cause the flap 6 to pivot in the direction of arrow R1 in FIG. 4.

The flap 6 includes two planar side walls 66, parallel to each other and perpendicular to the axis of rotation A6. The flap 6 also comprises a rear wall 68 that extends from the end 641, opposite a front edge 70 of the flap 6 relative to the axis A6. The rear wall 68, the side walls 66 and the wall defined by the planar surface 64 form, with a plate 90 of the calibrating element 8, a substantially sealed chamber C. The air entering the chamber C causes a pressure increase in that chamber, which results in maneuvering the flap 6 in rotation around the axis A6, in the direction of the arrow R2 in FIG. 4, against the force of the spring 14, to close the passage section S, using a technique known from FR-B-2,736,709.

At the intersections between the planar surface 64 and the rear wall 68 with the side walls 66, the flap 6 comprises two surfaces 72 that truncate the end 641 on either side of the plane IV, which is perpendicular to the axis A6. The surfaces 72 intersect the intersection between the planar surface 64, the rear surface 68 and the side surfaces 66, such that the travel of the flap 6 is not blocked by the surface 104. The surfaces 72 have a shape substantially corresponding to the shape of the inner surface 104. Relative to the case where the flap 6 does not comprise surfaces 72 that truncate the end 641, the surfaces 72 allow an additional travel of the flap 6.

Optionally, the surfaces 72 are in the form of a cylinder segment with a circular section and define a cylinder segment whereof the central axis A72 is shown only in FIG. 7. The curve radius of the surfaces 72 is denoted r72.

The surface 104 defines a cylinder segment whereof the central axis is combined with the axis X-X'. The curve radius of the surface 104 is denoted r104.

The curve radius r72 of the surfaces 72 is equal to the curve radius r104 of the surface 104 in the form of a cylinder segment. In that case, the additional travel of the flap 6 extends to a position in which the surfaces 72 can come into surface contact with the upper surface 104, owing to the correspondence of the curve radii r72 and r104.

According to an embodiment that is not shown, the surfaces 72 can be planar.

The rear surface 68 is curved and has a center of curvature situated on the axis of rotation A6. The rear surface 68 is shown as being a sphere segment surface. Alternatively, the rear surface 68 can be a cylinder surface with a circular section centered on the axis A6.

According to one embodiment of the invention that is not shown, the regulating device D may not comprise a chamber C in which the air pressure controls the position of the flap 6, but an inflatable bellows or a membrane that actuates the flap 6 using a technique known from DE-U-20 2004 003 811, or a system as described in patent FR-B-2,707,740.

In such a scenario, the surfaces that truncate the end of the flap 6 assume the form of edges that truncate the corners of the flap 6. The regulating device D comprises a sealing wall 12 that extends between the calibrating element 8 and an inner surface 106 formed by a lower surface of the inner duct 10. The sealing wall 12 is suitable for preventing the passage of air from the side of the inner duct 10 opposite the air passage section S. The sealing wall 12 is rotatable relative to the inner duct 10 under the action of the movement of the calibrating element 8. One edge of the sealing wall 12 comprises a cylindrical element 122 extending along an axis A12 of rotation of the sealing wall relative to the inner duct 10. The cylindrical part 122 is mounted in a cylindrical housing 108 of the inner duct 10 such that the wall 12 can pivot around the axis A12 that is parallel to the axis A6.

The sealing wall 12 is connected to the calibrating element 8 by two parallel slugs, one of which is shown in FIG. 4 with reference 84, formed on the calibrating element 8. The slugs 84 extend along the axis X-X' near a central zone of the calibrating element 8. The slugs 84 extend from a front wall 86 of the calibrating element 8 that is parallel to a front face 110 of the inner duct 10. The front wall 86 further comprises an oblong aperture 860 parallel to the axis A8. A screw, represented by its axis line 130, is mounted in a hole 112 of the front face 110 extending parallel to the axis X-X'. This screw ensures translational guiding of the calibrating element 8 along the axis A8 and securing of the calibrating element 8 to the inner duct 10. The translational guiding of the calibrating element 8 relative to the inner duct 10 is also ensured by two ribs 114 of the duct 10 that are parallel to each other and to the axis A8, suitable for sliding in corresponding slots 862 of the front wall 86. The slugs 84 and the slots 862 are situated on a side of the front wall 86 that is across from the front face 110.

The slugs 84 are inserted in two cavities 124 of the sealing wall 12. When the calibrating element 8 is moved toward its second position along the arrow F2 in FIG. 2, the sealing wall 12 is rotated along the arrow R3 in FIG. 4 by the fingers 84 that cooperate with the cavities 124. When the calibrating element 8 is moved from its first position toward its second position, the air passes on the sides of the front face 86, but does not pass through the device D owing to the sealing wall 12.

According to another embodiment that is not shown, the sealing wall 12 may be equipped with a spring that keeps it in contact with the calibrating element 8 in the direction of rotation R3.

The structure of the sealing wall 12 makes it possible to ensure the sealing of the regulating device D without using a front face covering the entire section of the inner duct 10, as is the case in FR-B-2,728,660. The front face 86 of the calibrating element 8 does not protrude from the device D, i.e., from the circumference of the sleeve 2, when the calibrating element 8 is in its first position.

In the first position of the calibrating element 8, the sealing wall 12 rests against the lower surface 106 parallel to the axis X-X'. This is possible owing to two recesses 116 formed in the inner duct 10 so as to receive the slugs 84 and tubes 126 defining the cavities 124, which protrude relative to the sealing wall 12. Thus, when the calibrating element 8 is in its first position, neither the sealing wall 12 nor its connections with the calibrating element 8 hinder the translational travel of the calibrating element 8.

According to an embodiment of the invention that is not shown, the device D does not comprise a sleeve 2 or an inner duct 10, but a single duct in which the calibrating element 8 is mounted.

According to another embodiment of the invention that is not shown, the sealing wall 12 can be connected to the calibrating element 8 by a single slug 84 inserted into a single cavity 124 of the sealing wall.

According to another embodiment that is not shown, the flap 6 of the regulating device D may not comprise surfaces 72 that truncate the end 641.

The features of the embodiments and alternatives described above can be combined in the context of the present invention.

The invention claimed is:

1. A device for regulating the air flow in a pipe, comprising:
    a duct suitable for being embedded in the pipe,
    a flap movable as a function of the air flow entering the duct, the flap delimiting, relative to an inner surface of the duct, an air passage section,
    a substantially L-shaped adjustable calibrating element movable in a translational manner only, mounted between a first position, in which the air flow that can pass in the device is maximal, and a second position, in which the air flow that can pass in the device is minimal, and
    a sealing wall, the sealing wall extending between the calibrating element and an inner surface of the duct, the sealing wall suitable for preventing the passage of air on the side of the duct opposite the air passage section, the sealing wall being rotatable relative to the pipe under the action of the movement of the calibrating element,
    wherein the substantially L-shaped calibrating element comprises a horizontal part that protrudes into the duct and a front wall part that extends downwardly along a front face of the duct wherein, when in the first position, the front wall of the L-shaped calibrating element, does not pass the circumference of a front face of the duct.

2. The regulating device according to claim 1, wherein the sealing wall is rotatable relative to the duct around an axis of rotation parallel to an axis of rotation of the flap.

3. The regulating device according to claim 2, wherein the sealing wall is connected to the calibrating element by at least one slug formed on the calibrating element and inserted into a cavity of the sealing wall.

4. The regulating device according to claim 3, wherein, in the first position of the calibrating element, the sealing wall rests against a planar wall of the regulating device in a position parallel to the longitudinal axis of the duct, and
    the planar wall comprises at least one recess for receiving the slug of the calibrating element and part of the sealing wall defining the cavity.

5. The regulating device according to claim 3, wherein the calibrating element comprises two parallel slugs inserted in two parallel cavities of the sealing wall.

6. The regulating device according to claim 1, wherein the flap comprises, on one end of a planar surface of the flap, two surfaces that truncate the end of the planar face of the flap and the shape of which corresponds to the shape of an inner surface of the duct.

7. The regulating device according to claim 6, wherein the surfaces that truncate the end of the flap are in the form of a cylinder segment with a circular section.

8. The regulating device according to claim 7, wherein the curve radius of the cylinder segment surfaces is equal to the curve radius of a cylinder segment inner surface of the duct.

9. The regulating device according to claim 7, wherein the flap comprises two planar side walls parallel to each other and perpendicular to an axis of rotation of the flap, and a rear surface extending from the end of the planar surface opposite a front edge of the flap relative to the axis of rotation of the flap, and wherein the cylinder segment surfaces are arranged at the intersections between the planar surface, the rear surface and the side walls.

10. The regulating device according to claim 9, wherein in the second position of the calibrating element, the travel of the flap extends to a limit position in which the area of the air passage section is minimal, and in which the cylinder segment surface of the flap can come into surface contact with the cylinder segment inner surface of the duct.

* * * * *